April 27, 1943.  J. F. MERKEL  2,317,472
CONTROL MACHINE FOR SWITCH AND SIGNAL CONTROL SYSTEMS
Filed June 7, 1940  3 Sheets-Sheet 1

INVENTOR
J. F. Merkel,
BY Neil W. Preston
his ATTORNEY

April 27, 1943.　　　J. F. MERKEL　　　2,317,472

CONTROL MACHINE FOR SWITCH AND SIGNAL CONTROL SYSTEMS

Filed June 7, 1940　　　3 Sheets-Sheet 2

April 27, 1943. J. F. MERKEL 2,317,472
CONTROL MACHINE FOR SWITCH AND SIGNAL CONTROL SYSTEMS
Filed June 7, 1940 3 Sheets-Sheet 3
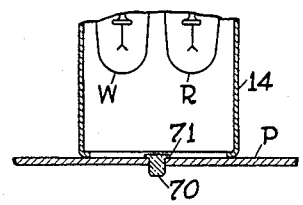
Fig. 15.
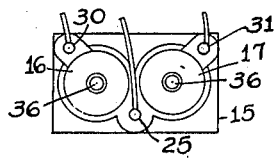
Fig. 16.
Fig. 13.
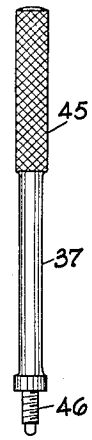
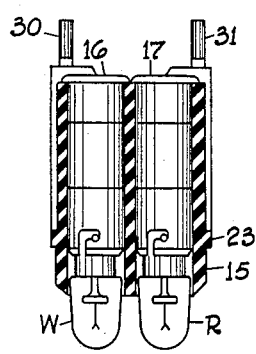
Fig. 6.
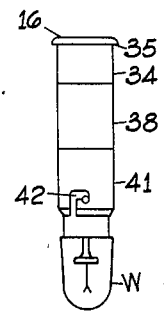
Fig. 10.
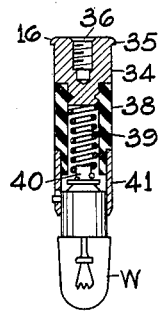
Fig. 11.
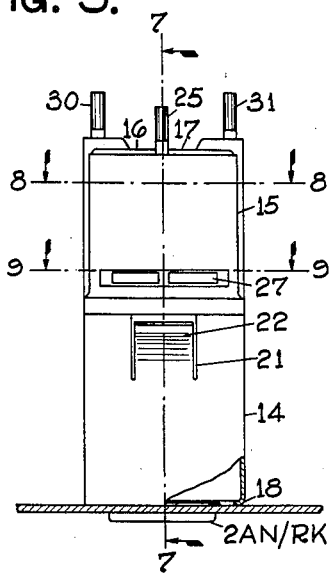
Fig. 5.
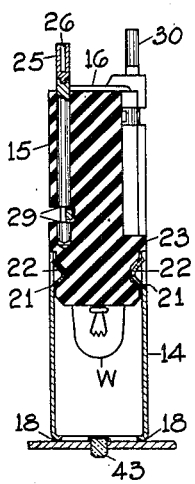
Fig. 7.
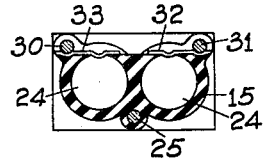
Fig. 8.
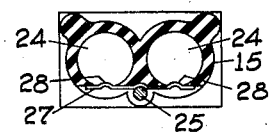
Fig. 9.
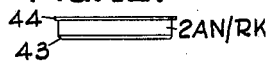
Fig. 12.
INVENTOR
J. F. Merkel,
BY Neil W. Preston,
his ATTORNEY Patented Apr. 27, 1943

2,317,472

UNITED STATES PATENT OFFICE 2,317,472

CONTROL MACHINE FOR SWITCH AND SIGNAL CONTROL SYSTEMS

Joseph F. Merkel, Rochester, N. Y., assignor to General Railway Signal Company, Rochester, N. Y.

Application June 7, 1940, Serial No. 339,360

3 Claims. (Cl. 177—311)

This invention relates to control machines for switch and signal control systems of the entrance-exit type, and it more particularly pertains to the display of indications on control panels of such machines.

In an entrance-exit system the setting up of routes through a track layout affording a number of conflicting routes extending between entrance and exit points is effective in accordance with the actuation by an operator of buttons provided on a control panel for designation of the respective entrance and exit ends of each route to be set up. In order that an operator can most comprehensively designate the ends of available routes to be set up, the control panel has a miniature track diagram with the entrance and exit buttons disposed thereon at points comparable to the respective entrance and exit ends of routes at the track layout, and the trackway of the diagram is made up of longitudinal translucent inserts, the illumination of which by the selective energization of miniature lamps in the rear thereof definitely defines routes established, the condition of occupancy by trains of the track layout, and the condition of the track switches. The entrance-exit system for setting up routes responsive to entrance and exit designation and the circuits for the selective energization of the miniature lamps for indication purposes can be provided, for example, as disclosed in the prior application of Judge, Ser. No. 330,535, filed April 19, 1940.

An object of the present invention is to provide most advantageously structural means for the display along the track diagram of each of the distinctive indications provided by the control circuits in the above mentioned Judge application, or by other indication circuits of a similar character. In that application the track occupancy conditions are indicated distinctive from other indications by the color of the miniature lamps illuminated, and the unlocked condition of the track switches is indicated distinctive from other indications by the flashing of the indicator lamps, but the particular portion of the trackway of the diagram and the particular track switch and position of such track switch with which indications are associated is determined only by the arrangement of the various inserts. Requisites of the structure of such a diagram as satisfied by the present invention are that the inserts be of uniform length having uniform lamp unit assemblies for their illumination to facilitate production manufacture, that they be positioned at points along the diagram most comparable to the indications which they are to provide, that they be relatively evenly spaced end-to-end short distances apart in order that, when illuminated in accordance with a route which has been established, they may display a relatively continuous line of light corresponding to such route, and that the size of the diagram as determined by the space required for the lamp unit assemblies on the back of the panel be reduced to a minimum in order that all portions of a complex track diagram be within the most convenient reach and vision of an operator.

Another object of the present invention is to facilitate the replacement of lamps of the various lamp units by providing a lamp socket for each of the units which is removable from a lamp receptacle, such socket making electrical contact with contacts on the receptacle to which control wires are attached, thus allowing the replacement of burned-out lamps without disturbing the wires. The removal of each of the lamp sockets is facilitated by the use of an extractor which engages the base of the socket.

Another object of the present invention is to provide even diffusion of light for each translucent insert by securing the miniature lamps behind such insert at a relatively greater distance from the panel than from the sides of a box-like casing forming a light compartment in which they are included, and yet conduct the heat of such casing or box efficiently to the control panel from which it can be readily dissipated.

Other objects, purposes and characteristic features of the present invention will be in part obvious from the accompanying drawings and in part pointed out as the description of the invention progresses.

In describing the invention in detail reference will be made to the accompanying drawings in which corresponding parts are generally identified by corresponding reference characters and in which:

Fig. 5 is a plan view of a light unit typical of each of the light units shown in Fig. 4;

Fig. 6 is a fragmentary plan view of the light unit shown in Fig. 5 with certain parts shown in cross section;

Fig. 7 is a sectional side elevational view of the light unit as viewed along the line 7—7 of Fig. 5;

Fig. 8 is a sectional view of the light unit with certain parts removed as viewed along the line 8—8 of Fig. 5;

Fig. 9 is a sectional view of the light unit with certain parts removed as viewed along the line 9—9 of Fig. 5;

Fig. 10 is a plan veiw of a lamp and socket removed from the light unit shown in Fig. 5;

Fig. 11 is a side elevational view of a lamp and socket removed from the light unit shown in Fig. 5 with the socket shown in cross section;

Fig. 12 is a plan view of the translucent insert of the light unit shown in Fig. 5;

Fig. 13 is a plan view of an extractor for removing the lamps and sockets from the respective light units;

Fig. 15 is a sectional plan view of one of the light units as used in the modified form of displaying indications as shown in Fig. 14, and;

Fig. 16 is an end view of the light unit illustrated in Fig. 5 showing the facility by which the lamp sockets may be removed.

Figure 1:
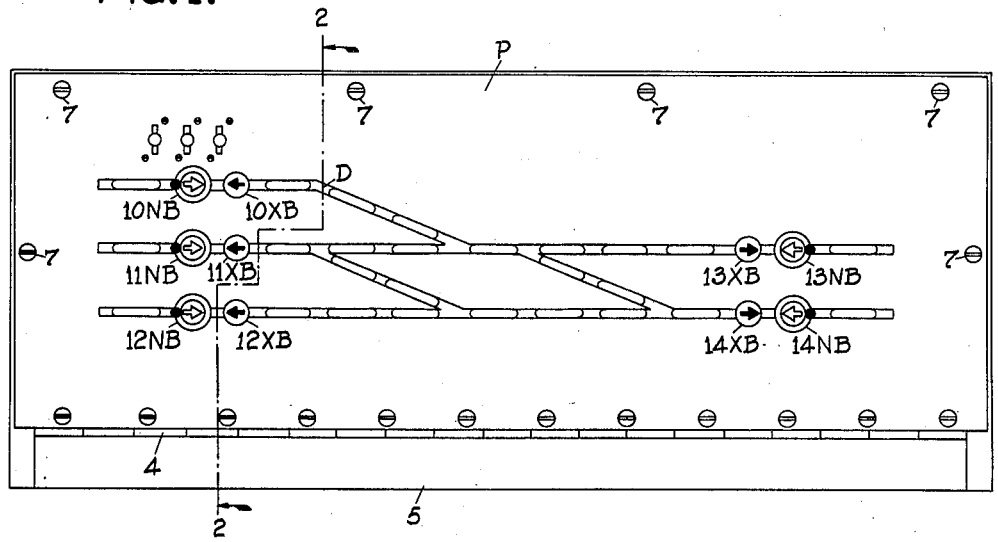
Fig. 1 is a front elevational view of an entrance-exit control machine.
Figure 2:
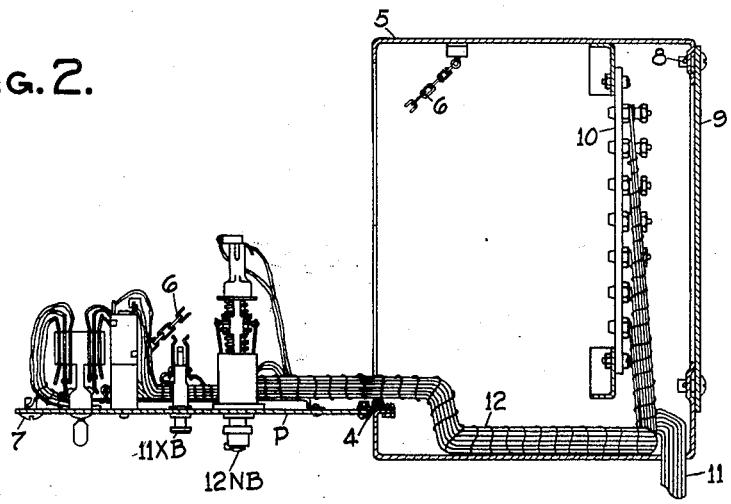
Fig. 2 is a sectional side elevational view of the control machine as viewed along the line 2—2 of Fig. 1.

With reference to Figs. 1 and 2, a control panel P upon which a miniature track diagram D is constructed, has hinges 4 at its base hinging it to the cabinet 5 to allow the panel to open outwardly from a vertical to a horizontal position in which the parts on the back of the panel are most readily accessible. The panel P is maintained in its horizontal position by a limiting chain 6 or by other limiting means, and in its vertical position by screw fasteners 7 which cam around pins, such as pin 8 (see Fig. 2), which are secured as by spot welding across openings in the cabinet for receiving the fasteners 7. A cover 9 on the back of the cabinet is secured by similar fasteners, and when removed makes readily accessible terminals on a terminal board 10 for the connection of wires entering the cabinet in a wire cable 11 to wires extending to the various units on the back of the panel in a cable 12. It will be noted with reference to Fig. 2 that the wires of cable 12 lay close to the panel and thus provide the greatest degree of accessibility for the wire terminals and indicator lamps of the various light units.

Figure 3:
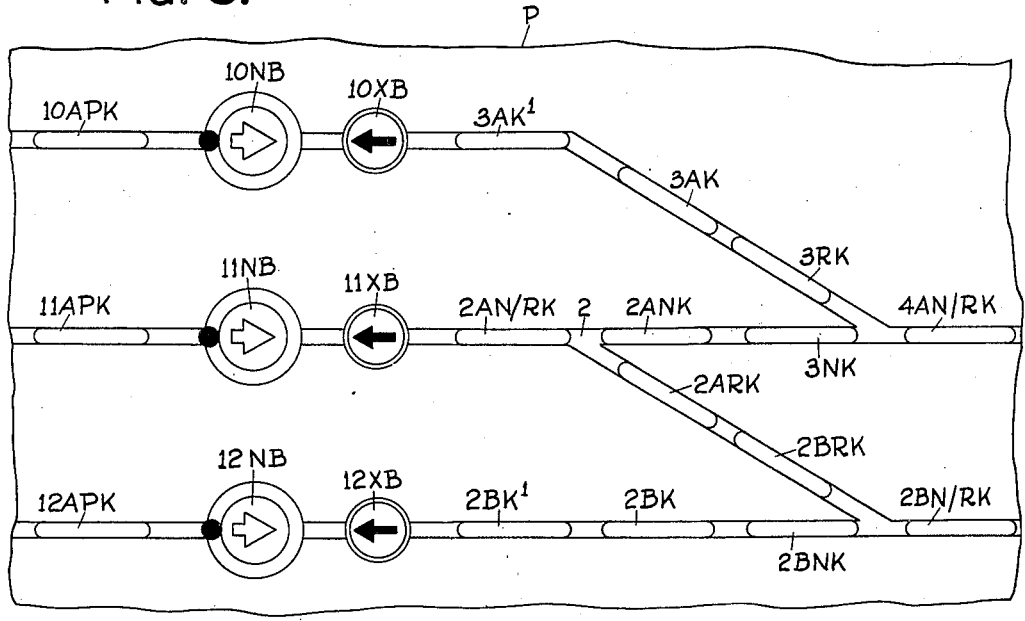
Fig. 3 is an enlarged elevational view of a portion of the front of the control machine shown in Fig. 1.

With reference to Fig. 3 in which a portion of the control panel P is more clearly illustrated, the track diagram is constructed of linear translucent inserts, such as insert 2AN/RK, extending through slots cut in the control panel P. Each of the translucent inserts can be individually illuminated to provide a plurality of distinctive indications in accordance with the selective energization of indicator lamps included in a light unit such, for example, as unit 13 (see Fig. 4) which is provided for the illumination of the translucent insert 2AN/RK (see Fig. 3).

The translucent inserts are all of a uniform length for convenience in manufacture and assembly, the length being relatively short in order to insure even illumination throughout. The inserts or translucent strips constitute collectively the trackway of the miniature track diagram as they are located end-to-end along the control panel, there being a relatively small space included between the ends of adjacent inserts. The arrangement of the inserts along the trackway of the diagram conforms to required positions for the display of distinctive indications. The arrangement of the inserts is also dependent to some extent upon the facility of arranging the light units on the back of the panel.

The control panel P is preferably of sheet metal having a dull black finish for contrast to the translucent inserts which form a miniature track diagram, and annular slots are cut in the panel along the trackway of the diagram to admit the various translucent inserts, there being a uniform and relatively short space between each of the slots, such space being sufficient, however, to provide adequate support and rigidity to the panel. The space on the diagram between the adjacent ends of the translucent inserts such, for example, as the space 2 between the inserts 2AN/RK and 2ANK is painted pearl white to conform to the color of the translucent inserts when the lamps which are in the light units behind them are extinguished. Such being the case, with the indicator lamps extinguished, the trackway of the diagram is in effect defined by continuous pearl white lines extending from one end of the diagram to the other, while the illumination of any one of the translucent inserts definitely defines the limits of such insert, thus definitely identifying the device or function indicated. It is of course to be understood that the portions between the translucent inserts in the track diagram can as well be defined by other means, such, for example, as by the cementing of Celluloid strips on the diagram.

Each of the lamp units for the individual illumination of the translucent inserts comprises a box-like case forming a light compartment secured to the back of the panel, and such casing removably secures a receptacle which in turn removably secures each of two lamp sockets, one of such lamp sockets having a white lamp removable therefrom and the other of such sockets having a red lamp removable therefrom. For example, the lamp unit 13 (see Fig. 4) comprises a light case 14 (see Fig. 5) removably securing a receptacle 15 which in turn removably secures the bullet type lamp sockets 16 and 17 (see Fig. 6). The miniature white lamp W is removable from the socket 16 and the miniature red lamp R is removable from the socket 17.

The light case 14 (see Fig. 7) is preferably constructed of thin sheet metal which readily conducts heat, formed in the shape of a rectangular box-like compartment for surrounding the translucent insert 2AN/RK on the back of the panel. The length of the light case is equal to the length of the insert plus the space included between two adjacent inserts. The edges 18 of the light case 14 are beaded over, and the light case is soldered or welded all along such bead to the back of the metal control panel to form an efficient heat conducting connection between such case and the panel P, the case being centered longitudinally over the translucent insert 2AN/RK. Although the light case 14 is centered laterally over the insert 2AN/RK, it can be secured to the panel off-center from its associated insert without perceptibly affecting the illumination of such insert, as is shown for the light units 19 and 20 (see Fig. 4) which are shifted off-center in order that the minimum spacing is required between the tracks of the track diagram. It is also of particular advantage under some conditions encountered in practice to shift the light cases off-center to provide space for a cable of wires leading to the various receptacles. The light case 14 (see Fig. 7) has resilient fingers 21 stamped out of the opposite sides thereof, such fingers having V-shaped bends 22 for receiving the receptacle 15. The end of the light case away from the panel is left open for receiving the receptacle.

With reference to Fig. 7 the lamp W, and the lamp R shown in Fig. 6, are at a position within the box-like light compartment comparatively closer to the thin metal walls of the case than to the back of the panel. Such arangement provides for the even illumination of the tarnslucent insert 2AN/RK, the light being reflected from the sides of the light case by a coating on the inside of such case of highly reflective white enamel or lacquer. Diffusion is therefore partially accomplished by the distance of the lamps from the panel and by a large percentage of the illumination being supplied by light reflected from the light case.

It can be seen that the positioning of the lamps to obtain maximum diffusion causes comparatively more heat to be transmitted to the various light cases than to the control panel. However, with the good heat conducting connection of each of the light cases to the panel, the heat is readily transmitted from the cases to the panel from which it can be readily dissipated into the room. In this manner the heat from the lamps is readily conducted from the enclosed portion of the control machine to the outside air of the room and therefore prevents the overheating of the wires and other devices on the back of the panel.

Figure 4:
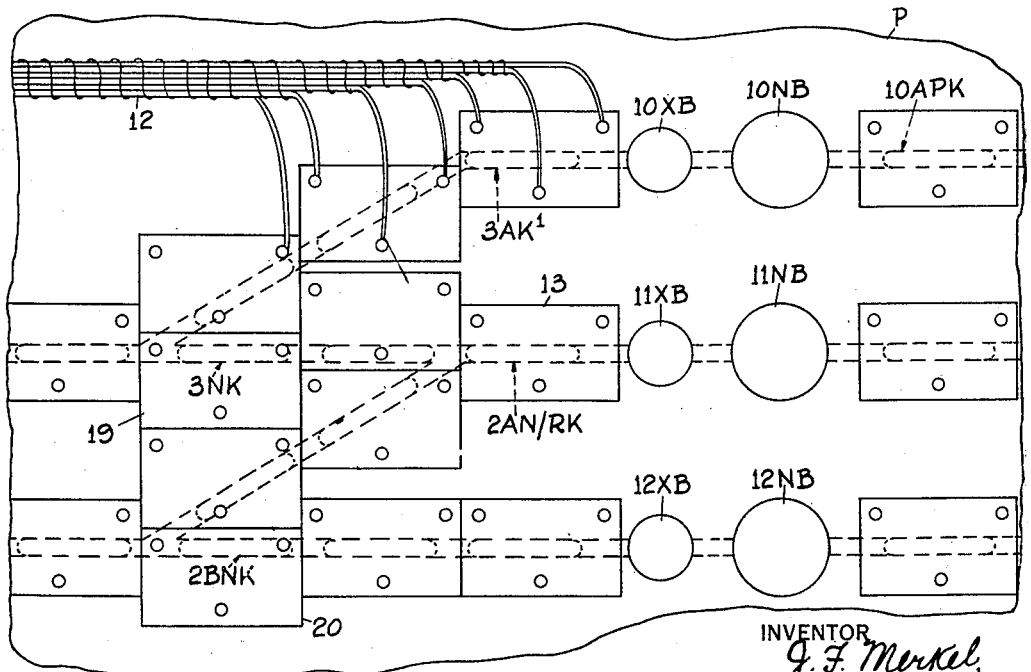
Fig. 4 is a rear view of the portion of the control panel of the control machine shown in Fig. 3 showing the arrangement of the light units.

By the use of two translucent inserts for the portion of the trackway corresponding to each of the crossovers, it is provided that standard size lamp units can be used throughout, and the arrangement of the lamp units as illustrated in Fig. 4 utilizes the space on the back of the panel most advantageously to provide a standard relatively small spacing between the centers of the tracks of the diagram of 1½ inches. It is to be understood, however, that different track spacings from that specified can be used although other spacing generally speaking is believed to be less advantageous in pactice. All of the light cases are longitudinally secured to the back of the panel even though the translucent inserts for the trackway corresponding to the cross-over extend diagonally with respect to the inserts comparable to the main tracks. This arrangement, together with certain of the light cases for the main track being laterally off-center from their inserts, allows the relatively small spacing of the tracks and facilitates the assembly of the various light units on the control panel. It will be noted with reference to Fig. 4 that under conditions where the track switches for the various tracks are opposite each other four light cases are arranged one above the other for the inserts used in indicating the positions of the respective track switches, there being no space between those light cases. Longitudinally, the light cases always have their ends adjacent, even where crossovers and single track switches are involved, and laterally they form rows or tiers, one light case directly above another.

The receptacle 15 (see Fig. 6) is molded of an insulating material, such as "Bakelite." It has a rectangular base with V-shape indentations in the sides thereof adapting it to be removably received by the fingers 21 of the light case 14, such receptacle being inserted within the case 14 until the shoulder 23 of the receptacle comes to rest against the edges of the case, thus completing the enclosure of the lamps after the lamp sockets 16 and 17 are inserted so as to prevent the accumulation of dust and guard against the entering of light into the light compartment from an extraneous source.

The receptacle 15 has holes 24 molded therein for receiving the removable bullet type sockets. The common control wire terminal 25 (see Fig. 7) is inserted through a hole molded in the receptacle, such terminal having a hole 26 in the end thereof for receiving and soldering control wires. Resilient contact 27 (see Fig. 9) is inserted in a slot in the receptacle, such contact having nubs 28 extending into the holes 24 for making contact with the bullet type sockets when they are inserted. The contact 27 is held in position by an indentation at its center which in assembly snaps back of shoulders 29 (see Fig. 7) of the common wire terminal 25. In a similar manner, control terminals 30 and 31 (see Fig. 5) are secure by independent contacts 32 and 33 respectively (see Fig. 8). Such contacts have nubs which make contact with the respective red and white lamp sockets when they are inserted into the receptacle.

Each of the bullet type lamp sockets corresponds to the socket 16 (see Figs. 10 and 11) which has a cylindrical metal contact end member 34, having a shoulder stop 35 which limits its insertion into the receptacle 15, such contact end member has a tapped hole 36 in the end thereof for receiving an extractor 37 (see Fig. 13), and it is secured in molding to a midsection 38 (see Fig. 11) molded of insulating material with a longitudinal center hole in which a contact spring 39 is inserted. Such spring has one end in contact with the metal contact end member 34, and the last turn of the spring at that end is slightly larger in diameter so that the spring is retained within the molded midsection after it is inserted by twisting in assembly. The metal contact 40 is fitted into the opposite end of the contact spring, and such contact is retained within that spring because of the end of the spring dropping behind a shoulder in the contact.

The contact spring 39 urges the contact 40 against a center contact of the standard bayonet base of the miniature white lamp W. The lamp is removably receivable in a metallic sleeve 41 molded into the insulating midsection 38, and it has a slot 42 (see Fig. 10) for receiving and locking in position the detent in the bayonet base of the miniature lamp W.

Each of the translucent inserts is molded of translucent material adapted to most advantageously diffuse the light of the indicator lamps provided for its illumination. The insert 2AN/RK (see Fig. 12), for example, is molded in a size and shape to be received into the annular slot cut therefor in the control panel, and it has a slightly beveled front edge 43 and a shoulder 44 which acts as a stop when the insert is inserted into the panel from the rear, thus limiting the degree of insertion through such slot. The shoulder 44 provides a contact surface with the panel for cementing the insert thereto, the cement used being of a character which can be readily broken in case it is desired to remove the insert for replacement or cleaning.

The use of the extractor 37 for the removal of the respective lamp sockets facilitates such removal as it is in the form of a metal rod which can be readily inserted between control wires on the back of the diagram without disturbing such wires. One end of the extractor has a knurled portion 45 to facilitate handling, and the opposite end of the extractor 46 is threaded to be receivable within the tapped hole 36 of lamp socket 16, or within the tapped hole of any of the other lamp sockets. It is to be understood that other means of engagement of the extractor with each of the various lamp sockets can be employed, such, for example, as the use of a hook and eye arrangement.

It is to be understood that the detailed description which has been set forth with reference to the structure of one of the light units is typical of the structure of each of the other light units of the diagram. It will be noted from the detailed description with reference to the drawings, that each of the receptacles is provided with two independent contacts, and one common contact, together with wire terminals for those respective contacts. The common contact is at a position in the receptacle where it will make electrical contact with the sleeves of the lamp sockets (see Fig. 5) when such sockets are inserted in the receptacle, and the independent contacts are at positions to contact the respective end contact members of those lamp sockets. Thus, each of the lamps can be independently energized in accordance with circuit selections provided by various control devices, replacement of the lamps, however, being readily effected without disconnecting or disturbing any of the wires for their control.

The reasons for requiring the independent control of so many indicator lamps confined in such a small space can well be realized upon reference to the above mentioned prior application of Judge, Ser. No. 330,535, which discloses in detail control circuits for each of the indicator lamps required for the track diagram of the present disclosure.

Figure 14:
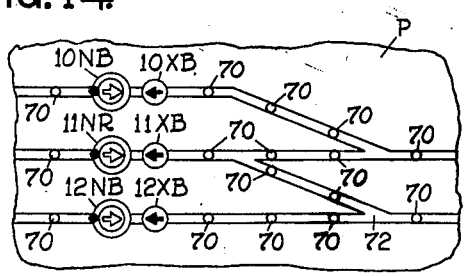
Fig. 14 is a modification showing the trackway of the diagram as having translucent inserts which provide points of light when illuminated.

With reference to Figs. 14 and 15, a modification of the system for the display of indications along the trackway of the track diagram is shown to provide for the defining of established routes by points of light rather than by effectively continuous lines of light. The use of such points of light clearly defines the various established routes, but yet reduces to a minimum the glare in the eyes of an operator. Of course other means can be employed for reducing glare such, for example, as by the use of a master dimming switch to vary the intensity of the illumination of the lamps as required in accordance with the varying of the intensity of the light in the room in which the control machine is located, such means being applicable to either the point of light or the line of light systems.

If the indications are to be provided by points of light as shown in Fig. 14, the light units are provided and spaced at the back of the panel as has been described, but each of the translucent inserts 70 rather than being linear in shape, is circular and of a diameter preferably not greater than the width of the trackway of the track diagram. Thus, with reference to Fig. 15, as a typical example, the insert 70 is molded of translucent material in a cylindrical shape, and is inserted through a hole cut in the panel P so that the shoulder 71 of the insert 70 is cemented to the back of the panel. When in that position such insert of course transmits to the front of the panel light of distinctive colors in accordance with the selective energization of the indicator lamps of that lamp unit.

Each of the inserts is located in the center longitudinally of its light unit, and therefore the inserts are comparatively evenly spaced longitudinally along the diagram, thus maintaining the effect of balance of all portions of each route indicated when the indicator lamps are illuminated, as if such route were defined by a continuous line of light, the track portions of the diagram such as track portions 72 between the inserts being painted white or covered with white Celluloid or the like, to clearly define the trackway of the diagram in contrast to the dark finish of the metal control panel P.

It is to be understood that the present invention is applicable to an NX system for practically any track layout encountered in practice, the various parts of the diagram of this embodiment of the invention being of such a typical nature that persons skilled in the art can construct more complex diagrams from the simplified showing in this disclosure.

Having described a means for displaying indications along the trackway of a particular miniature track diagram on a control panel as one specific embodiment of the present invention, it is to be understood that this form is selected to facilitate the disclosure of the present invention rather than to limit the number of forms such invention may assume, and it is to be further understood that various modifications, adaptations and alterations can be applied to the specific form shown to meet the requirements of practice without in any manner departing from the spirit or scope of the present invention except as limited by the appending claims.

What I claim is:

1. In a control panel for switch and signal control systems having a track diagram composed of several track portions, a translucent insert in each of the portions, such insert being removable from the back of the panel, and a light unit on the back of the panel for each of the inserts comprising a light case secured to the back of the panel and surrounding the insert, a receptacle receivable in the case so as to be quickly detachable therefrom and having an insulated portion with a contact and a wire connected thereto, and a lamp socket adapted to receive a standard base lamp receivable in the receptacle so as to be quickly detachable therefrom having an insulated portion with a contact secured thereto such contact being engageable with said contact of said receptacle so as to complete an independent circuit connection with said wire when such socket is received within said receptacle, whereby the removability of the socket allows replacement of the lamp without disturbing the wire, and the removability of the receptacle allows replacement of the insert.

2. In a control panel for switch and signal control systems having a track diagram composed of several track sections, there being a translucent portion in the trackway of the diagram for each of the track sections, a light unit on the back of the panel for each of the translucent portions comprising a light case secured to the panel and surrounding the translucent portion, a receptacle formed of insulating material receivable in said case so as to be quickly detachable therefrom and having independent contacts and wires connected thereto, and a lamp socket adapted to receive a standard base lamp and receivable in said receptacle so as to be quickly detachable therefrom, said lamp socket having contacts spaced by insulating material and engageable with said independent contacts of said receptacle to close circuit connections with said wires, whereby receptacles can be readily replaced without removing the light cases and lamps can be readily replaced without disturbing the wires.

3. In a control panel for switch and signal control systems having a track diagram in which the trackway is composed of a plurality of translucent portions, a light unit on the back of the panel for the illumination of each of the translucent portions comprising a light case secured to the panel and having a resilient detent, a receptacle of insulating material formed to be engaged by said detent within said case so as to render the receptacle quickly detachable from said case, such receptacle having a cylindrical opening formed therein and having electrical contacts with wires connected thereto spaced longitudinally along such opening, and a lamp socket adapted to receive a standard base lamp receivable within said cylindrical opening so as to be quickly detachable therefrom, such socket having cylindrical contacts spaced longitudinally so as to make electrical contact with the respective contacts of said receptacle, whereby a standard base lamp can be adapted to be plug coupled into said receptacle and the receptacle with its wire connections is readily detachable from said case.

JOSEPH F. MERKEL.